Figure 1:
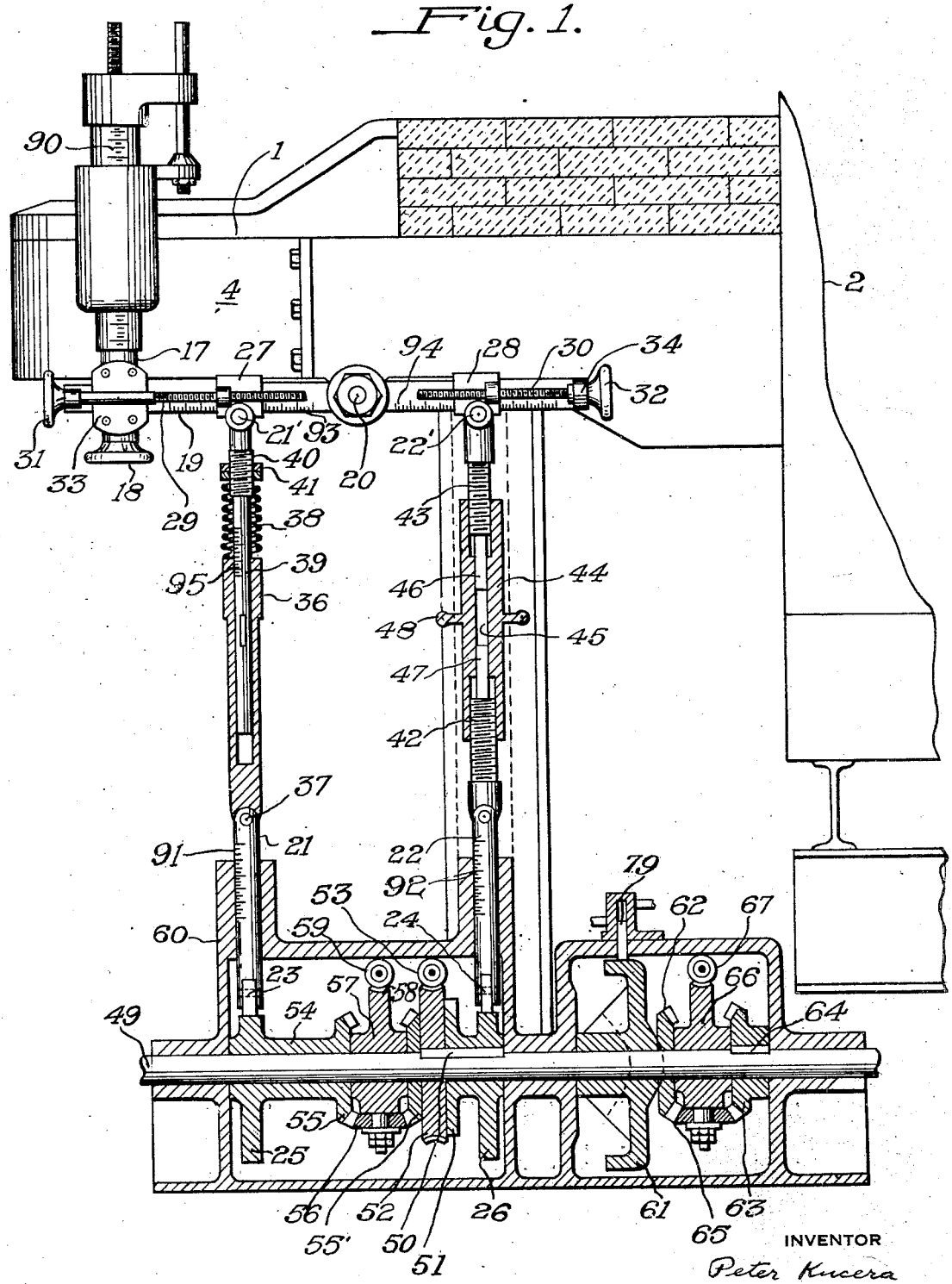

April 16, 1935.　　　P. KUCERA　　　1,997,798
GLASS FEEDER
Filed Nov. 19, 1931　　　4 Sheets-Sheet 1

INVENTOR
Peter Kucera
by William B. Jaspert
Attorney.

April 16, 1935.  P. KUCERA  1,997,798

GLASS FEEDER

Filed Nov. 19, 1931  4 Sheets-Sheet 2

INVENTOR

Peter Kucera by William B. Jaspert
Attorney.

April 16, 1935.  P. KUCERA  1,997,798
GLASS FEEDER
Filed Nov. 19, 1931   4 Sheets-Sheet 3

INVENTOR
Peter Kucera
by William B. Jaspert
Attorney.

April 16, 1935.  P. KUCERA  1,997,798
GLASS FEEDER
Filed Nov. 19, 1931  4 Sheets-Sheet 4
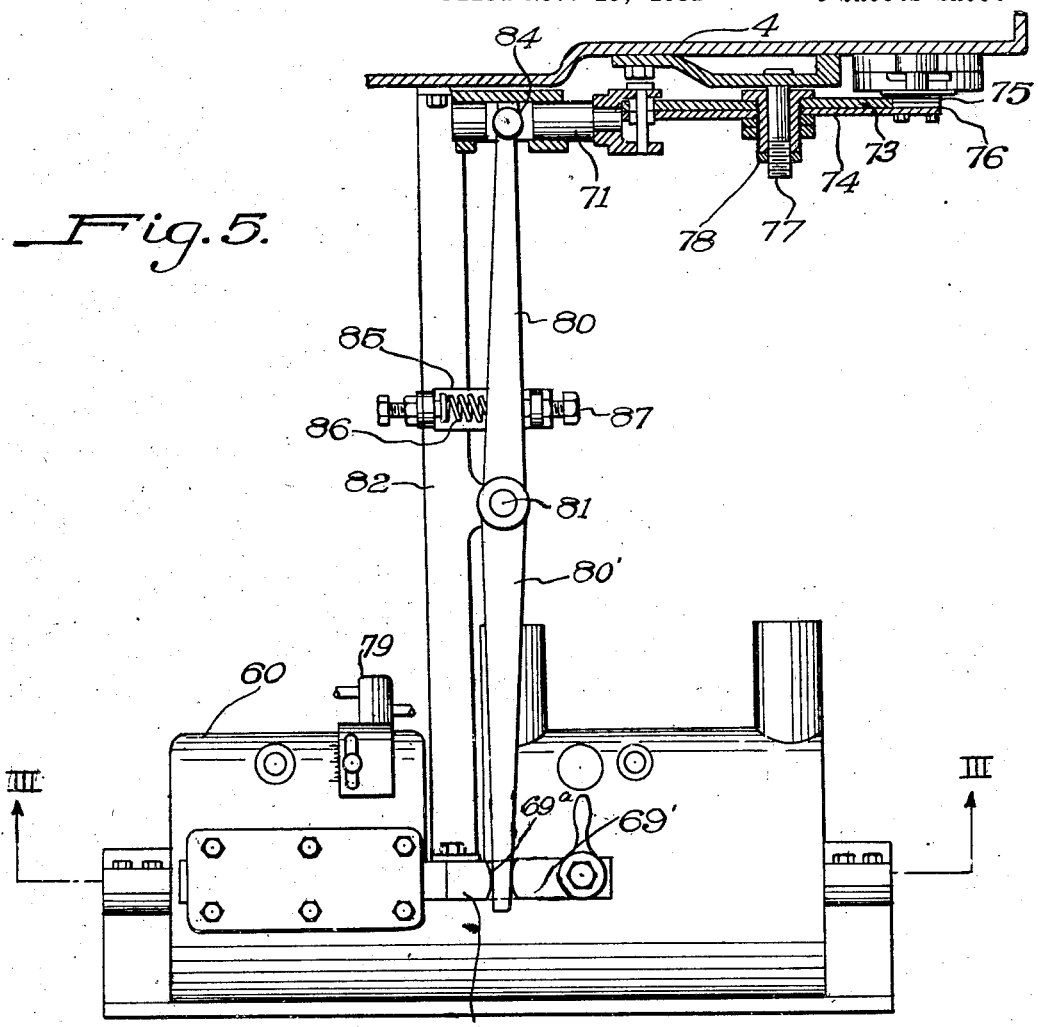
Fig. 5.
Fig. 7.
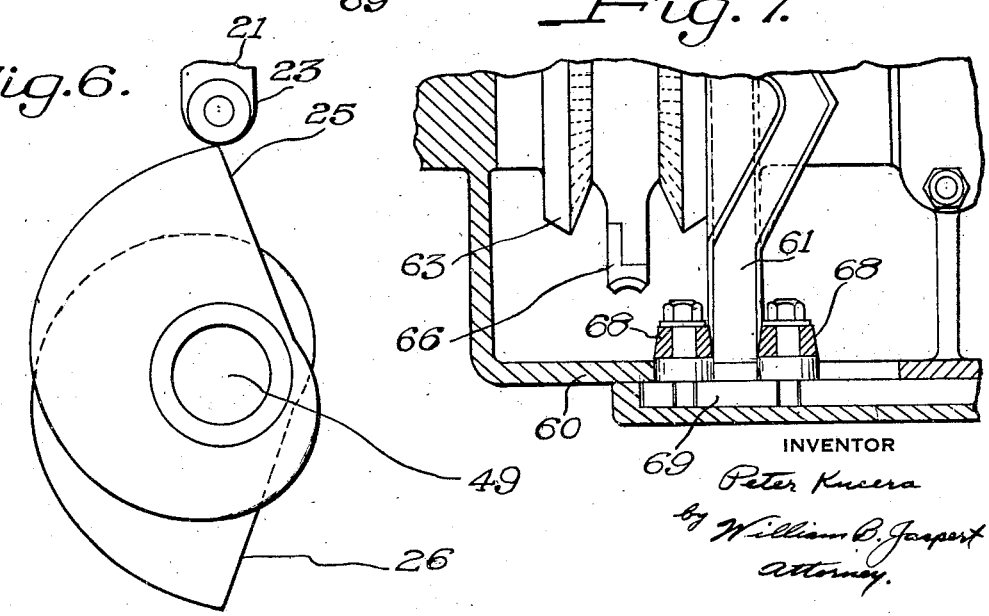
Fig. 6.
INVENTOR
Peter Kucera
by William B. Jaspert
Attorney.

Patented Apr. 16, 1935

1,997,798

UNITED STATES PATENT OFFICE 1,997,798

GLASS FEEDER

Peter Kucera, Bellevue, Pa., assignor to Hartford-Empire Company, Hartford, Conn., a corporation of Delaware Application November 19, 1931, Serial No. 576,024

9 Claims. (Cl. 49—55)

This invention relates to improvements in feeders for glass forming machinery more particularly to the type generally known in the art as suspended charge feeders and it is among the objects thereof to provide a feeder which shall be provided with improved means for regulating the size, shape and rate of feeding of the suspended charge; which shall be adapted for adjustment without interrupting its glass feeding operation; and which shall be provided with indicating means for recording the adjustments for future reproduction of identical movements and dwells of all parts.

The primary object of the invention is the provision of improved mechanical means for operating the plunger and the shearing mechanism and for coordinating the operation of the shearing mechanism with the movement of the plunger, together with improved mechanical means for adjusting the stroke of the plunger and for effecting a rapid return stroke thereof for purposes to be hereinafter stated.

Figure 2:
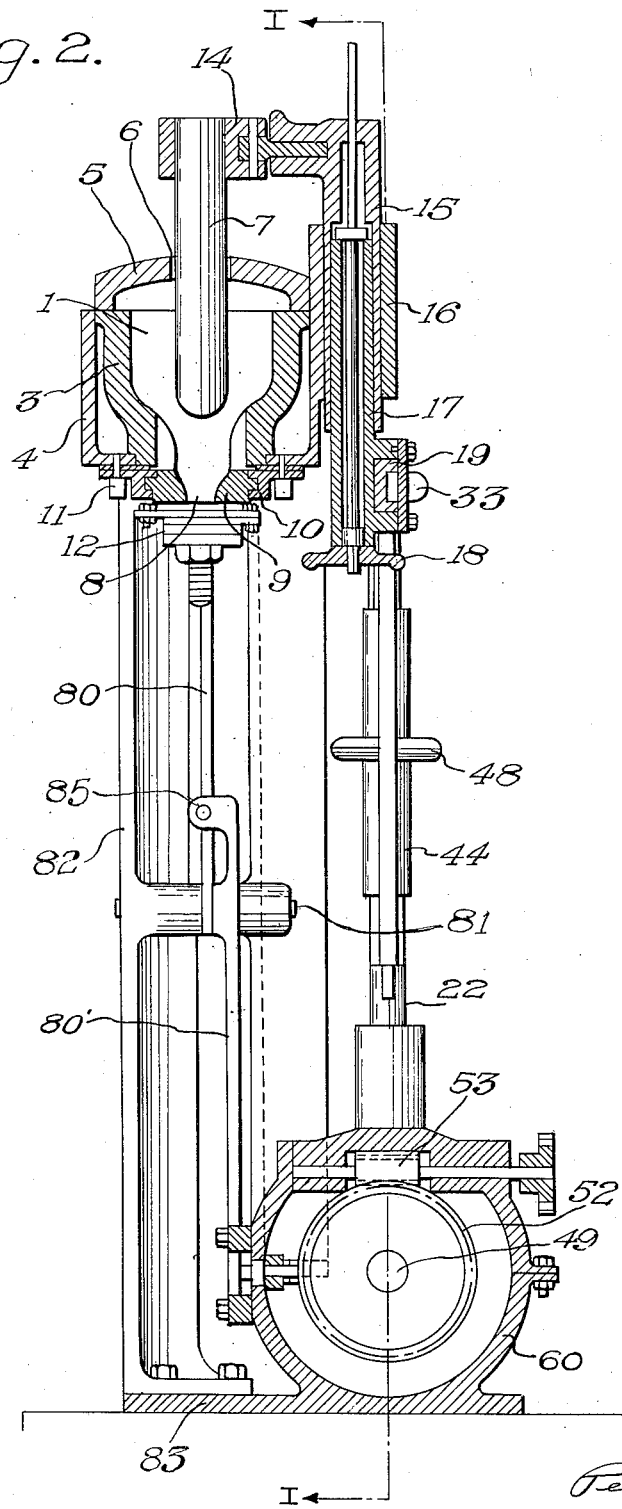
Figure 3:
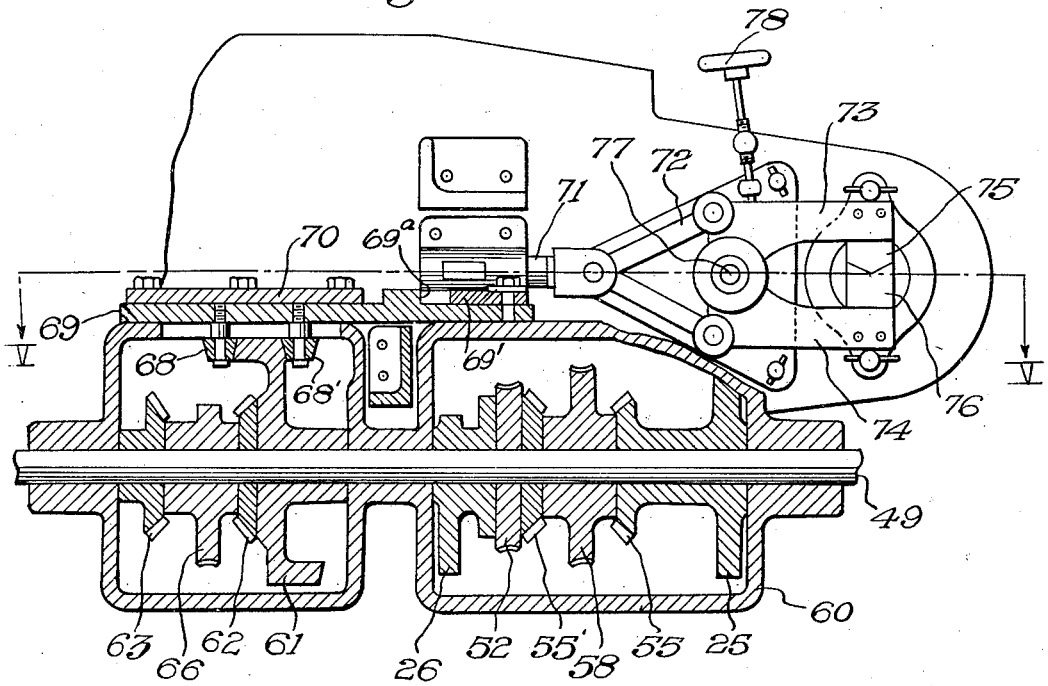
Figure 4:
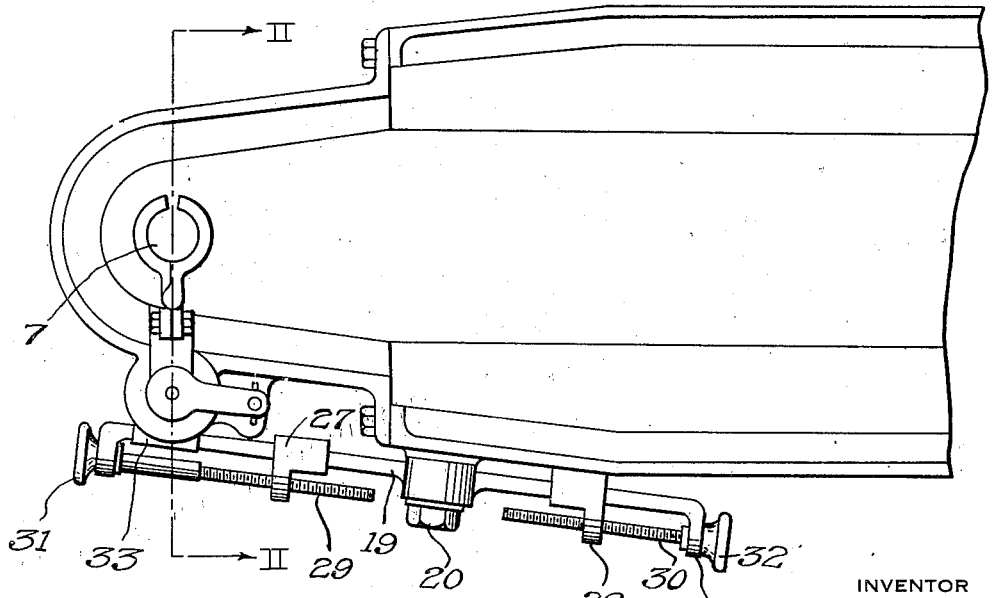

These and other objects of the invention will become more apparent from a consideration of the accompanying drawings constituting a part hereof in which like reference characters designate like parts and in which:

Figure 1 is a side elevational view partially in section of a feeder embodying the principles of this invention;

Figure 2 a front elevational view thereof showing the glass feeding channel and accompanying parts in cross-section and illustrating a portion of the drive mechanism in cross-section;

Figure 3 is a horizontal sectional view partially in elevation of the shear and drive mechanism;

Figure 4 a top plan view of Figure 1;

Figure 5 a side elevation partially in section of the shear operating mechanism;

Figure 6 a diagrammatic view of the plunger operating cam mechanism; and,

Figure 7 a similar view of the shear operating cam.

With reference to the several figures of the drawings, the structure therein illustrated comprises a glass feeding channel 1 communicating with a glass melting tank, a portion of which is designated by the reference character 2, the channel being of refractory walls 3 shown in Figure 2 enclosed within a metallic housing 4. The channel member 1 is preferably closed by a cover 5 having a perforation 6 through which the plunger 7 enters the glass channel, the channel and plunger being of the conventional form. An orifice 8 is provided at the bottom of the forward end of the channel in the refractory material 9 which is secured by a grooved anchoring plate 10, that is secured to the steel framework 4 by bolts 11.

Directly below the orifice is the shearing mechanism generally designated at 12 which is shown in detail in Figures 3 and 5 of the drawings.

The plunger 7 is secured in an off-set bracket 14 that is mounted on the end of a hollow sleeve 15 which has a sliding fit in a cylindrical bracket 16 which may be integrally formed with the steel housing 4 that supports the feeder channel 1. The feeding plunger 7 is operated by a vertically reciprocating plunger 17, the bottom of which is provided with a hand wheel 18 for adjusting the height of the refractory plunger 7. Connected to the vertically movable plunger 17 is an oscillating shaft or lever 19 which is pivoted at 20 at a point intermediate its length. The shaft 19 is operated through a pair of connecting rods 21 and 22 having cam followers 23 and 24 respectively which engage actuating cams 25 and 26. The rods 21 and 22 are connected to the oscillating lever 19 through suitable linkage having pivotal connections at 21' and 22' at opposite sides of the pivotal support for the lever, with slide brackets 27 and 28. These brackets are adjustable on the lever 19 by means of screws 29 and 30 having hand wheels 31 and 32 respectively which are journaled in the bracket 33 and an off-set portion 34. The linkage connecting the rod 21 to the slide bracket 27 consists of a hollow sleeve 36 pivoted at 37 to the rod 21 and having an enlarged end forming an abutment for a coil spring 38. A rod 39 is disposed in the hollow sleeve 36 and adapted for axial movement therein. The rod is provided with a screw threaded portion 40 on which are mounted a pair of ring nuts 41 which constitute an abutment for the coil spring 38 which together with the sleeve 36 limit the space within which the coil spring is confined. By adjusting the ring nuts 41, the spring 38 may be compressed to any desired degree for a purpose to be hereinafter stated.

Rod 22 is connected to slide bracket 28 by the following mechanism. Threaded studs 42 and 43 are pivotally connected to the rod 22 and slide bracket 28 respectively. A sleeve 44 having internally threaded ends is disposed in axial alignment with the studs with its threads coacting with the threaded portions of the studs.

The interior of sleeve 44 is provided with a constricted opening 45 which is adapted to receive pilots 46 and 47 of the studs to provide a maximum surface of contact between the sleeve and studs for any position of its adjustment which is effected through a hand wheel 48.

Cams 25 and 26 which actuate the oscillating arm 19 are mounted on a counter shaft 49 to which cam 26 is secured to rotate by a spline or key 50. Cam 26 has a flanged end 51 which constitutes a support for a worm gear 52. The worm gear is adapted to be rotated for angular movement by a worm 53 through which the counter shaft 49 is driven.

Cam 25 has an extension sleeve 54 terminating in a bevel gear 55 which constitutes one of the gears of a differential gear transmission of which the other gear 55' is adapted to rotate with the worm gear 52. Gear 56 is mounted on a hub member 57 having a worm gear face 58, the teeth of which interact with the worm 59 which is hand operated to effect angular adjustment between the cam surfaces of the cams 25 and 26. The counter shaft and differential mechanism are housed in a casing 60 one end of which is provided with the mechanism for operating the cutting shears and which consist of a cam 61 that rotates with a bevel gear 62, a bevel gear 63 which is keyed at 64 to the counter shaft 49 and a planetary gear 65 carried by a hub member 66 which is angularly movable through a worm 67 in the manner of the member 57 heretofore described.

Cam 61 operates the shear mechanism through engagement of cam followers 68, 68' which are connected to a reciprocating plate 69 mounted in a slide 70. Plate 69 operates a slide bar 71 which through toggles 72 actuate the cutting arms 73 and 74 to which the shears 75 and 76 are fastened. The arms are pivotally joined at 77. Vertical adjustment of the shears is provided through the screw mechanism 78.

The feeding and shearing mechanism is synchronized with the glass forming machine by a valve 79 Figure 1 which is controlled by the cam 61. The cam is provided with a high spot on its outer periphery which actuates the valve 79 in synchronism with the movements of the feeder. The valve 79 is adjustable to be advanced or retarded with the motion of the shear and retains the timed relation of the shearing action and the starting of the forming machine when the timing of the plunger and shear is adjusted.

Connection of the slide member 69 with the shear plunger 71 is effected through the mechanism disclosed in Figures 2 and 5 of the drawings which consists of levers 80 and 80' pivoted at 81 on an upright 82 extending from the housing 60 to which it is bolted at 83. The top of lever 80 is disposed in a slotted opening 84 of the plunger 71 and a combined shear adjusting and safety mechanism generally designated at 85 is mounted on the top of lever 80'. The mechanism 85 is provided with the coil spring 86 on one side of lever 80 and an adjustable set screw 87 on the other side of the lever, the adjustment of the screw 87 determining the amount of overlap of the shears and spring 86 to stop movement of the lever 80 when the shears engage an obstruction such as a stone in the glass to be cut.

In Figure 6 cams 25 and 26 are diagrammatically illustrated and are shown as opposed to each other, the follower 23 and plunger 21 being shown at the extreme rise of the cam 25.

It is very desirable to reproduce movements and dwells of the operating parts of the plunger and shear mechanisms and on account of the mechanism being mechanical as distinguished from fluid pressure or semi-fluid pressure operated devices and therefore positive in its action, the adjustable parts are provided with graduations that are calibrated in accordance with the adjustments desired or necessary for the proper operation of the feeder.

To this end calibrations 90 are provided on the plunger support 15 by means of which the plunger 7 may be positively set with respect to the outlet 8. Connecting rods 21 and 22 are calibrated at 91 and 92 to determine the adjustments effected by the cams 25 and 26 respectively. The oscillating bar 19 is calibrated at 93 and 94 to adjust the slide brackets 27 and 28. The rod 39 is calibrated at 95 to adjust the tension of spring 38, and the adjusting worm screws 59 and 67 are similarly calibrated to reproduce adjustments of the cams through the differential gear mechanisms.

The operation of the above described feeder mechanism is briefly as follows:

The primary elements of the apparatus comprises the feeding trough 1 from which molten glass is delivered in a stream through the orifice 8; the plunger 7 mounted for reciprocating movement in a vertical direction in register with the outlet orifice of the feeding trough 1; the shear 75 for severing this stream of molten glass at predetermined intervals thereby separating the severed glass from the source of supply; and the mechanism for actuating and regulating the plunger and shear in predetermined relation.

The operating mechanism produces positive movements and dwells and has a wide range of adjustments operative during the operation of the feeder to obtain and maintain the required weight and shape of suspended charge without interrupting the machine. There are no cams which must be changed and which would necessitate shutting down the machine and by means of the calibrated movable parts desired operating conditions may be reproduced at will.

The counter shaft 49 is actuated through the drive worm 53 by a suitable prime mover and since the hub members 57 and 66 are stationary, rotative movement is transmitted through the planetary gears 56 and 65 to the bevel gears 55 and 62 which rotate cams 25 and 61 respectively.

First describing the operation of the plunger it may be stated that the refractory plunger 7 is oscillated to subject it to the regular and steady downward movement which is effected through the cam 26.

The height of plunger 7 is regulated through the adjustment of the hand wheel 18 and the length of stroke of the plunger is varied through the adjustable sleeve 44 of the connecting rod operated by cam 26; also by adjusting the slide brackets 27 and 28.

Since cam 26 is keyed to the shaft 49, the cam 25 may be displaced with respect to the cam 26 by adjustment of the worm 59 which subjects the hub 57 to angular movement. When the worm 59 is rotated by hand, the cam 25 will be subjected to angular displacement relative to cam 26 and similarly by rotation of the worm 67 cam 61 is displaced relative to cams 25 and 26.

By adjusting the cams 25 and 26, the speed of the stroke of the plunger may be varied. There are provided adjustments that affect the location or height of the plunger, the length of stroke of the plunger, and the speed of the plunger cycle, these adjustments being the hand wheel 18, the movement of the slide brackets 27 and 28 through the hand wheels 31 and 32, the adjustment of the connecting rod of plunger 22 through the hand wheel 48, and the displacement of the cams 25 and 26 through the worm 75

59. All of these adjustments may be made while the feeder is in operation.

It has been found in practice that after the plunger has reached its lowermost position in displacing glass for a charge through the orifice and it is subjected to an impulsive thrust in the upward direction, it will cause a contraction of the suspended charge below the orifice which reduces the area of glass to be cut off by the shears. The plunger operating mechanism herein described is especially adapted to accomplish this function through the employment of the coil spring 38 which is compressed at the instant that the plunger 7 is in its lowermost position. Accordingly, when the follower of cam 26 passes from the high spot on the cam, spring 38 will produce a sudden upward thrust of the plunger which causes the suspended charge to contract just below the orifice in the plane of the shears. At the same instant, the cam 25 will cause the connecting rod of plunger 21 to raise the suspended charge feeding plunger 7 in its upward movement until at the end of the up stroke the follower 23 passes from the high spot of the cam at which time cam 26 will again become active to oscillate the shaft 19 in the direction for lowering the plunger. It is of course evident that the upward thrust of the plunger can be entirely eliminated by this same spring adjustment.

By adjusting the end of plunger 7 with the mouth of the orifice 8, a suspended charge of desired length and weight is produced. The forming of the suspended charge is also regulated by the speed of the plunger 7 in its downward travel which is regulated by the differential mechanism of the cams 25 and 26. If the speed of travel of the plunger 7 is in excess of the rate of flow of the glass to the orifice 8, a thicker suspended charge will be produced the same as the glass travel. Accordingly, the shape of the suspended charge can be controlled through the differential gears effecting cam displacement as previously described.

From the foregoing it is evident that the downward stroke of the plunger 7 may be regulated independently of the upward stroke and vice versa. Also that the length of the plunger stroke and dwells may be varied independently of the speed of stroke while the plunger is in motion.

With reference to the cam 61, suitable adjustment may be made through the worm 67 to displace cam 61 with respect to the cam 26 so that oscillation of the shear lever 80 may be coordinated with the feeding of the suspended charge. This adjustment may also be effected while the feeder is in operation, and the shear may be rendered inoperative by simply tripping the latch lever 69' shown in Figure 5 of the drawings.

In the normal operation of the shears, the latch 69', which is pivotally supported on the outer end portion of the slide bar 69, functions to retain the lower end portion of the lever 80' against an abutment or shoulder 69a on the slide bar 69. The surfaces of the shoulder 69a and of the latch in contact with lever 80' are curved, substantially as shown, to obviate any binding action on the lever when the slide bar is reciprocated to effect oscillation of the lever. If the latch 69' be tripped or turned angularly about the axis of its pivotal connection with the bar 69, as in a clockwise direction from the position shown in Fig. 5, the lever 80' will be released from the slide bar 69 when the latter is at the outer end of its stroke and the shears will be thrown out of operation with the blades thereof in their open or retracted positions. To cause resumption of operation of the shears by the reciprocating slide bar, it is only necessary to return the latch 69' to the position shown in Fig. 5.

By adjustment of cam 61 through the gear and worm 66 and 67, the action of the shear blades 75 and 76 may be advanced or retarded relative to the pulsating motions of the plunger, such adjustment being made while the shears are in motion. The positive action of the shears may similarly be adjusted relative to the mold movements of the forming machine by regulation of the valve 79 through cam 61.

From the foregoing description of the invention it will be evident that the movements and dwells of the plunger and shears may be varied and maintained in predetermined relation during the operation of the apparatus and that the operations of the several parts may be synchronized.

I claim:

1. In a glass feeder, a container for molten glass, said container having a submerged discharge outlet, an implement adapted for reciprocation in the glass toward and from the outlet, a lever adjacent to the container, connections between the lever and the implement of such character that oscillation of the lever will reciprocate the implement, cam actuated means for swinging the lever in one direction to move the implement away from the outlet, and other cam actuated means for swinging the lever in the opposite direction to move the implement toward the outlet, one of said cam actuated means including a lost motion device.

2. In a glass feeder, a container for molten glass, said container having a submerged discharge outlet, an implement adapted for reciprocation in the glass toward and from the outlet, a lever adjacent to the container, connections between the lever and the implement of such character that oscillation of the lever will reciprocate the implement, cam actuated means for swinging the lever in one direction to move the implement away from the outlet, and other cam actuated means for swinging the lever in the opposite direction to move the implement toward the outlet, one of said cam actuated means including a two-part lost motion device and a spring interposed between the parts of said lost motion device, the other of said cam actuated means being adjustable to vary the effect of the operation thereof on the lost motion device of the first cam actuated means.

3. In a glass feeder, a container for molten glass, said container having a submerged discharge outlet, an implement adapted for reciprocation in the glass toward and from the outlet, a lever adjacent to the container, connections between the lever and the implement of such character that oscillation of the lever will reciprocate the implement, a rotating cam, a connecting rod mechanism pivotally connected at one end with said lever and operable by said cam to swing the lever in one direction, a second rotating cam, a second connecting rod mechanism pivotally connected at one end to said lever and operable by the second cam to swing the lever in the opposite direction, and means for effecting a phase change between the cycle of rotation of one of said cams with respect to the cycle of rotation of the other cam.

4. In a glass feeder, a container for molten glass, said container having a submerged discharge outlet, an implement adapted for reciprocation in the glass toward and from the outlet, a lever adjacent to the container, connections between the lever and the implement of such character that oscillation of the lever will reciprocate the implement, a rotating cam, a connecting rod mechanism pivotally connected at one end with said lever and operable by said cam to swing the lever in one direction, a second rotating cam, a second connecting rod mechanism pivotally connected with one end to said lever and operable by the second cam to swing the lever in the opposite direction, and means for independently adjusting the points of pivotal connection between said connecting rod mechanisms and said lever.

5. In a glass feeder, a container for molten glass, said container having a submerged discharge outlet, an implement adapted for reciprocation in the glass toward and away from the outlet, a lever adjacent to the container, connections between the lever and the implement of such character that oscillation of the lever will reciprocate the implement, a cam shaft adjacent to said lever, a pair of cams mounted to rotate about the axis of said cam shaft, means operable during rotation of said cams for adjusting one of said cams angularly about the axis of said cam shaft independently of the other cam, and motion transmitting devices individual to said cams and receiving motion directly therefrom for oscillating said lever, said motion transmitting devices being connected directly to said lever.

6. In glass machinery, a reciprocatory member, a lever connected therewith in such manner that oscillation of the lever will reciprocate said member, a pair of rotating cams, a connecting rod mechanism pivotally connected at one end with said lever and operable by one of said cams to swing the lever in one direction, a second connecting rod mechanism operable by the other cam and pivotally connected with said lever for swinging said lever in the opposite direction, one of said connecting rod mechanisms including a lost motion device comprising spaced relatively movable elements and a spring yieldingly resisting relative movement between the said elements.

7. In a glass feeder, glass severing mechanism comprising a pair of shear blades, a lever, connections between the lever and the shear blades of such character that oscillation of the lever will open and close said shear blades, a reciprocating actuator effective when moving in one direction to swing said lever to position to effect opening of the shear blades, and a pivoted latch movable bodily with the actuator and normally connecting the lever with the actuator so that the return movement of the latter will swing the lever to position to effect closing of the shear blades, said latch being movable at will to position to cause release of said lever from the actuator after the lever has been swung to its first named positon.

8. In a glass feeder, glass severing mechanism comprising a pair of pivoted shear blades, a lever, connections between the lever and the shear blades of such character that oscillation of the lever will alternately open and close the shear blades, a slide member having an abutment bearing against one side of the free end portion of said lever, and a pivoted latch carried by the slide member and normally bearing against the opposite side of the free end portion of said lever, whereby the lever will be oscillated by said reciprocating slide member and latch, said latch being swingable at will to a position out of motion-transmitting engagement with the lever, whereby the latter may remain stationary at one end of its path of swinging movement during the continued reciprocation of said slide member.

9. In a glass feeder, glass severing mechanism comprising a pair of pivoted shear blades, a pivoted lever, connections between said lever and said shear blades of such character that oscillation of the lever will open and close said shear blades, a second lever pivoted to swing about the same axis as the first lever, such second lever having an extended end portion overlapping a portion of the first lever, an adjusting screw carried by said extending end portion of the second lever in position to bear against one edge of the adjacent portion of the first lever, a coil spring carried by said extending end portion of the second lever in position to bear against the opposite edge of the adjacent portion of the first lever, whereby swinging movement of the second lever will swing the first lever positively to position to effect opening of the shear blades and the return swinging movement of the second lever will transmit motion through said spring to said first lever to swing the latter in the direction required to close the shear blades, and means for oscillating said second lever.

PETER KUCERA.